United States Patent [19]

Manoogian et al.

[11] 3,891,005
[45] June 24, 1975

[54] SINGLE HANDLE WATER FAUCET VALVE

[75] Inventors: Alex Manoogian, Groose Pointe Farms; Eric V. Pullen, Southfield, both of Mich.

[73] Assignee: Masco Corporation of Indiana, Taylor, Mich.

[22] Filed: May 28, 1974

[21] Appl. No.: 473,809

[52] U.S. Cl. ............ 137/625.4; 137/636.3; 251/285
[51] Int. Cl. .............................................. F16k 11/00
[58] Field of Search ........ 137/625.17, 625.4, 625.41, 137/636, 636.2, 636.3; 251/284, 285

[56] References Cited
UNITED STATES PATENTS

| | | | |
|---|---|---|---|
| 1,443,539 | 1/1923 | Jansen | 251/284 X |
| 3,324,884 | 6/1967 | Dornaus | 137/636.3 X |
| 3,384,119 | 5/1968 | Manoogian | 137/625.4 X |
| 3,674,048 | 7/1972 | Manoogian et al. | 137/270 |
| 3,747,638 | 7/1973 | Manoogian et al. | 137/625.4 |

*Primary Examiner*—Martin P. Schwadron
*Assistant Examiner*—Richard Gerard
*Attorney, Agent, or Firm*—E. Dennis O'Connor

[57] ABSTRACT

A single handle hot and cold water mixing and flow control faucet valve of the type wherein the operating handle is swingable through a plane to vary flow volume passing through the valve and rotatable about its own axis to vary the proportions of the hot and cold water passing through the valve. Stop means are provided on the valve body and operating handle to prevent swinging movement of the handle to and from the off position unless the handle is in a cold water only position and to prevent rotation of the handle in one direction. Additional adjustable stop means may be provided to limit the extent of possible rotational movement from a cold water only position towards a hot water only position.

15 Claims, 5 Drawing Figures

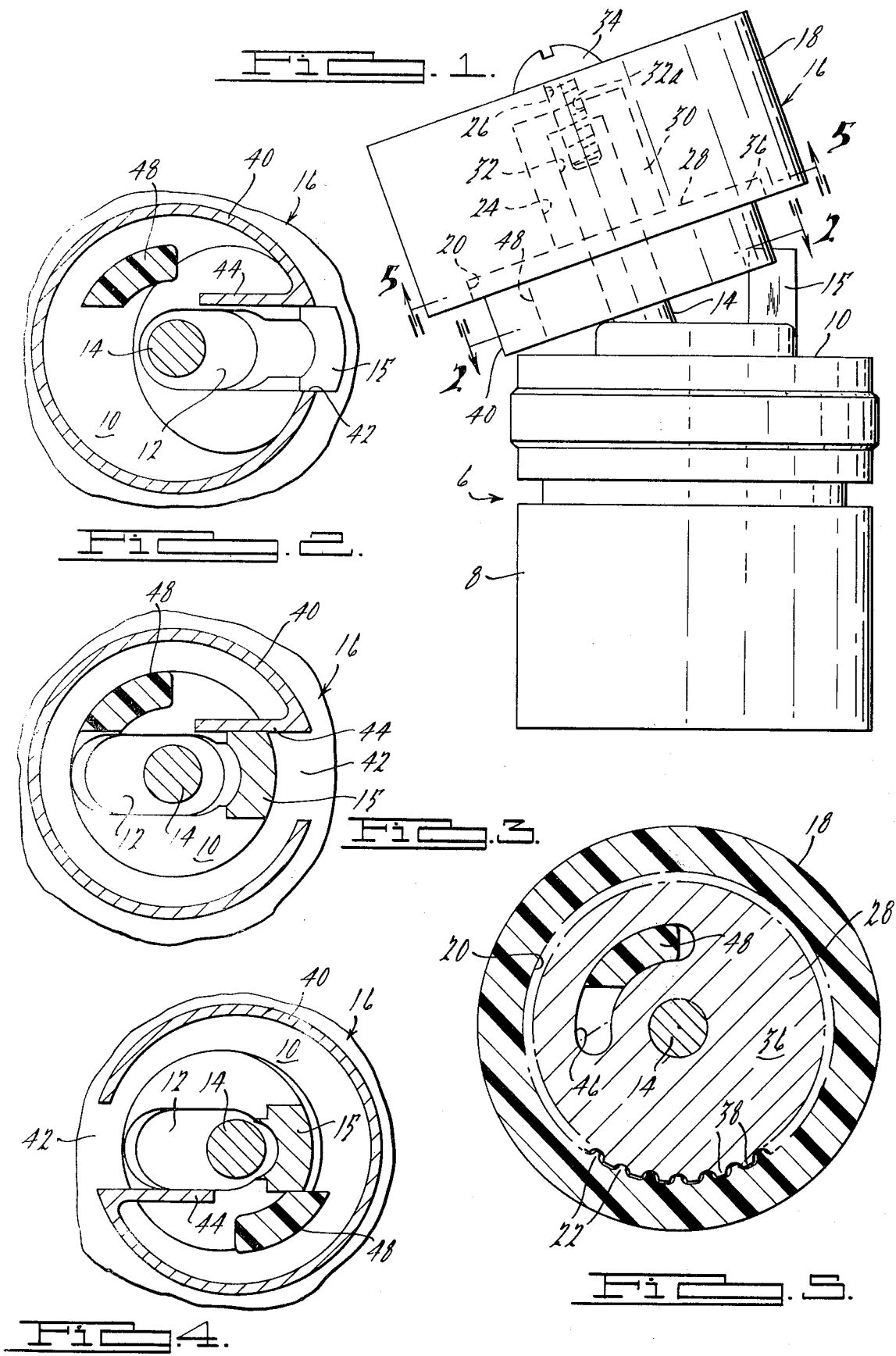

SINGLE HANDLE WATER FAUCET VALVE

BACKGROUND OF THE INVENTION

Single handle faucets for the control of both hot and cold water flow have gained wide acceptance in the construction industry as well as with the consuming public. The advantages of such faucets are many and include the capability of mixing or blending hot and cold water from separate sources or selectively allowing flow of only hot or cold water, and controlling the flow volume by manipulation of a single operating handle. A well known type of single handle faucet valve provides for swinging handle movement in a plane to control water flow volume and rotation of the handle about its own axis to vary the proportions of hot and cold water passing through the valve. An example of this type of single handle faucet valve is disclosed by U.S. patent application Ser. No. 387,786, filed Aug. 13, 1973, and assigned to the parent corporation of the assignee of this invention.

Recently, certain parties concerned with plumbing aspects of the construction industry have concluded that it is desirable, and in some cases necessary, that hot and cold water single handle faucet valves be incapable of manipulation so that the operating handle moves from the "off" position directly to a position whereat only water from the hot water source passes through the valve. Additionally, its been urged that faucet valves of this type be adjustable so that the hot water portion of total flow volume selectively can be limited in response to various hot water temperatures that may be provided by different hot water sources. In fact, in at least one instance, such requirements for single handle faucet valve have been included in governmental building code requirements.

It is, therefore, an object of this invention to provide a single handle faucet valve of the type disclosed in U.S. patent application Ser. No. 387,786 that is incapable of being manipulated directly from an "off" condition to a condition wherein only hot water is supplied through the valve. In particular, the operating handle of the faucet valve of this invention can be moved from the off position to a hot water only position only by first passing through a relatively high volume cold water only position. Another object of this invention is the provision of a single handle faucet valve of the type previously described that is adjustable to limit the possible percentage of water from the hot water source in the total water flow to compensate for variances in the temperature of hot water supplied from different hot water sources. A still further object of this invention is the provision of a faucet valve having the above-mentioned features provided by structure that is relatively simple in design, reliable in performance and easily may be manufactured, assembled and serviced.

SUMMARY OF THE INVENTION

A single handle hot and cold water mixing and flow control faucet valve constructed in accordance with this invention is the type having a main body enclosing relatively movable valve means selectively operable to connect or isolate hot and cold water sources with water outlet means. An elongate manually movable operating stem is connected to the valve means for movement therewith and projects from the valve main body. This operating stem is swingable in a plane between an off position and a full volume position to vary the flow volume through the faucet valve and is rotatable about its own axis between a cold water only position and a hot water only position to vary the proportions of hot and cold water passing through the faucet valve. The improvement of this invention comprises fixed stop means secured to and projecting from the valve main body adjacent the stem. Movable stop means are secured to the stem for movement therewith and cooperated with the fixed stop means to prevent swinging movement of the stem to and from the off position unless the stem is in a cold water only position. Also, the movable stop means prevent rotation of the stem in one rotational direction. Additional movable stop means also may be provided which, through cooperation with the fixed stop means, limit the extent of possible rotational movement of the stem in the other rotational direction.

DESCRIPTION OF THE DRAWING

FIG. 1 is a side elevation view of a faucet valve of this invention with the valve handle in the off position;

FIG. 2 is a sectional view taken along the line 2—2 of FIG. 1;

FIG. 3 is a view similar to FIG. 2 but showing the valve handle in a high volume, cold water only position;

FIG. 4 is a view similar to FIG. 3 but showing the valve handle in a high volume, hot water only position, and FIG. 5 is a sectional view taken along the line 5—5 of FIG. 1.

DETAILED DESCRIPTION OF THE INVENTION

Referring now in detail to the drawing and in particular to FIG. 1 thereof, the numeral 6 denotes generally a single handle water faucet valve constructed in accordance with this invention. Valve 6 is shown in a generally vertical orientation as is normal for a valve of this type used in conjunction with a sink or like plumbing equipment. It should be noted, however, that the valve of this invention may be oriented in any desired position such as a horizontal position as would be normal for such a valve used in conjunction with a shower or bathtub.

Valve 6 has a main body 8 within which are located relatively movable valve means selectively operable to interconnect sources of hot and cold water with outlet means such as a spout. The internal construction of valve 6 comprises no part of the present invention and may be identical to the internal structure of the valve disclosed in said U.S. patent application Ser. No. 387,786.

The upper portion of main body 8 is closed by a cap 10 having a central aperture or slot 12 formed therethrough. A valve operating stem 14, operably secured at its lower end within main body 8 to the movable valve means, projects through the slot 12 in cap 10. (As is fully explained in U.S. patent application Ser. No. 387,786, valves of this type are constructed such that swinging movement of stem 14 in the plane of the drawing as viewed in FIG. 1 controls the volume of water passing through the valve, while rotation of stem 14 about its own axis varies the proportions of hot and cold water passing through the valve.)

Projecting upwardly from and integral with cap 10 is a post or fixed stop member 15, the function of which will be described in detail below. A manually grippable, composite handle 16 is carried by the stem 14 for unitary movement therewith. Composite handle 16 includes a relatively large member 18 through which is formed a passageway comprising a relatively large diameter counterbore 20 having interior teeth or splines 22 formed on the wall surface thereof, intermediate bore 24 and a relatively small bore 26 located near the uppermost extremity of member 18. A second handle member 28 partially is telescopically received in member 18. Member 28 includes an elongate sleeve 30 received in intermediate bore 24 of member 18 and having a central aperture 32 extending therethrough. The uppermost portion 32a of bore 32 is of reduced diameter. A screw 34 passes through the top of bore 26 of member 18 portion 32a of bore 32 of member 28 and into a tapped opening in the top of stem 14 to secure the composite handle 16 together.

Member 28 further includes a large diameter portion 36 received within counterbore 20 of member 18. External teeth or splines 38 on portion 36 mate with splines 22 on member 18 as best may be seen in FIG. 3 of the drawing. The cooperation between splines 22 and 38 insures that members 18 and 28 rotate in unison. Member 28 further includes a downwardly extending circular flange 40 that extends away from member 18. As best may be seen in FIGS. 2, 3 and 4, the circular shape of flange 40 is interrupted by an opening 42 having a width slightly greater than the width of fixed stop 15. Adjacent opening 42, a straight line flange 44, integral with flange 40, extends inwardly into the enclosure defined by circular flange 40.

With particular reference to FIG. 5 of the drawing, it may be seen that large diameter portion 36 of member 28 has an arcuate opening 46 formed therethrough. The arcuate sides of opening 46 are defined by arcs of circles having centers concentric with the center of stem 14. An arcuate projection or hot water stop 48 integrally is formed with member 18 and projects therefrom through opening 46. The length of stop 48 is such that its lowermost extremity is at approximately the same elevation as the lowermost extremity of flanges 40 and 44.

To appreciate the functional significance of the structure described above, it is important to note that FIGS. 1 and 2 show the valve 6 in an off position in that stem 14 has been swung, in the plane of the drawing as viewed in FIG. 1, to the left in an angular orientation from the vertical to the end of slot 12. Also, the rotational position of stem 14 in FIGS. 1 and 2 is such that only cold water can pass through faucet 6 with the stem 14 in this rotational position.

Member 28 is positioned on stem 14 such that the opening 42 in flange 40 registers with fixed stop 15. It thus may be seen from FIG. 2 that because fixed stop 15 is located within the opening 42 with stem 14 in the off position, it is impossible for handle 16 and stem 14 to be rotated from the cold water only position when the stem is in the off flow position. Thus, as stem 14 is swung towards the right as viewed in FIG. 1 and the valve is opened to permit the flow of water therethrough, the water passing through the valve will be cold water only.

FIG. 3 illustrates the valve after stem 14 has been swung partially to the right as viewed in FIG. 1 such that relatively large volumes of cold water are passing through the valve. In this position, stop 15 is no longer abutted by the side walls of opening 42 so that the handle 16, and hence stem 14, can be rotated about the axis of stem 14. Since the rotational position of stem 14 in FIGS. 1 and 2 is the cold water only position, flange 44, which continues to abut stop 15 during the movement of the handle from the position of FIG. 2 to the position of FIG. 3, serves as a cold water stop member. This is because it prohibits clockwise rotation of the handle 16 past the cold water only position and thus locates the cold water only position during manual manipulation of the handle. It readily may be appreciated, however, that in the position of FIG. 3, handle 16 may be rotated counterclockwise such that stem 14 is rotated out of the cold water only position toward the hot water only position of FIG. 4 and into positions wherein a blend of hot and cold water is passed through valve 6.

In FIG. 4, the valve handle 16 has been rotated counterclockwise until hot water stop 48 has abutted the side of fixed stop 15. In this position only water from the hot water source is passing through valve 6. It is important to note that direct movement from the off position of FIG. 2 into the hot water only position of FIG. 4 is impossible as the valve handle 16 must be moved through an intermediate position (such as the position of FIG. 3) whereat relatively a large volume of cold water only flow is achieved.

With handle 16 in the position of FIG. 4 or a hot-cold water blend position intermediate the positions of FIGS. 3 and 4, limited volume control is possible by swinging movement of the handle 16. However, in the position of FIG. 4 or in such an intermediate position, it is impossible to return handle 16 to the off position since swinging movement of the handle to the left to the end of slot 12 is impeded by abutment between the inner wall of flange 40 and the arcuate outer wall of fixed stop 15. In order for the valve handle to be returned to the off position, it must be rotated to a cold water only position (FIG. 3) whereat full swinging movement of the handle to the left end of slot 12 is possible.

As described above, the extent or number of degrees of rotation of handle 16 is limited by the abutment between flange-cold water stop 44 and hot water stop 48 with opposite sides of fixed stop 15. Thus, it is possible to limit the rotation of stem 14 toward the hot water only position by a movement of hot water stop 48 counterclockwise relative to cold water stop 44. By such an adjusting the relative positions of stops 48 and 44, the maximum percentage of hot water in the total water flow through valve 6 may be varied to compensate for the varying temperatures of hot water that may be supplied from hot water sources. The valve of this invention includes the capability of such adjustment.

In order to vary the relative positions of stops 48 and 44, it is only necessary to remove screw 34 from handle 16. With the screw removed, member 18 can be lifted such that member 28 is partially removed from member 18 so splines 22 and 38 no longer are engaged. Member 18 then can be rotated relative to member 28 to the degree permitted by the permissable movement of stop 48 in opening 46. When the desired rotation of member 18 (and thus stop 48) is achieved, member 28 can be reinserted fully into member 18, teeth 22 and 38 are once again engaged and screw 38 reinserted to lock the pieces in the desired orientation. Such an adjustment does not cause a misalignment of member 28 relative to stop 15, because the presence of stop 15 within the opening 42 prevents rotation of member 28. Adjustment movement is thus accomplished solely by rotation of member 18.

It should be noted that although the drawings depict the handle of the faucet valve of this invention with the larger member 18 telescopically receiving a smaller member 28 from the bottom, these positions easily could be reversed. In such a modification, the flange 40 and cold water stop 44 would be formed on the bottom extremity of the larger handle member and the smaller handle member, including hot water stop 48, would be telescopically received in the top of the larger member with stop 48 projecting through an opening in the bottom of this larger member.

It thus may be seen that this invention provides a single handle faucet valve that is incapable of being varied directly from an off condition to a condition wherein only hot water is supplied. The operating handle of the faucet valve of this invention can be moved from an off position to a hot water only position only by first passing through a high volume, cold water only position. Also, the single handle faucet of this invention is adjustable to limit the maximum percentage of hot water in the total water flow to compensate for variances in the temperature of hot water supplied from hot water sources.

We claim:

1. A single handle hot and cold water mixing and flow control faucet valve of the type having a main body enclosing relatively movable valve means selectively operable to connect or isolate hot and cold water sources with water outlet means and an elongate manually movable operating stem operably connected to said valve means for movement therewith and projecting from said main body, said stem being swingable in a plane between an off position and a full volume position to vary the flow volume through said faucet valve and rotatable about its own axis between a cold water only position and a hot water only position to vary the proportions of hot and cold water passing through said faucet valve, the improvement comprising: fixed stop means secured to and projecting from said main body adjacent said stem, first movable stop means secured to said stem for movement therewith and cooperating with said fixed stop means to prevent swinging movement of said stem to and from said off position unless said stem is in the cold water only position, second movable stop means secured to said stem for movement therewith and cooperating with said fixed stop means to prevent rotation of said stem in one rotational direction, and third movable stop means secured to said stem for movement therewith and cooperating with said fixed stop means to limit the extent of possible rotational movement of said stem in the other rotational direction.

2. The faucet valve of claim 1, wherein said first and second movable stop means are formed on a first member secured to said stem and said third movable stop means is formed on a second member secured to said stem.

3. The faucet valve of claim 2, wherein said first and second members each carry cooperating interconnecting means adjustably positioning said members relative to one another to adjustably space said first and third movable stop means vary the extent of possible stem rotation.

4. The faucet valve of claim 3, wherein said interconnecting means comprise splines formed on said members.

5. The faucet valve of claim 1, wherein said first movable stop means comprises a flange having an opening therethrough, said opening being in registry with said fixed stop means when said stem is in the cold water only position.

6. The faucet valve of claim 5, wherein said second movable stop means is positioned adjacent the opening in said first movable stop means.

7. The faucet valve of claim 2, wherein said second member is at least partially telescopically received by said first member and said third movable stop means projects through an opening formed in said first member.

8. A single handle hot and cold water mixing and flow control faucet valve of the type having a main body enclosing relatively movable valve means selectively operable to connect or isolate hot and cold water sources with water outlet means and an elongate manually movable valve operating stem operably connected to said valve means for movement therewith and projecting from said main body, said stem being swingable in a plane to vary the volume of water passing through said faucet valve and rotatable about its own axis to vary the proportions of hot and cold water passing through said faucet valve, the improvement comprising: a fixed stop means secured to said main body and projecting therefrom adjacent said stem, handle means mounted on said stem for movement therewith, said handle means including a first member having a first movable stop means thereon and cooperating with said fixed stop to prevent rotation of said stem in one direction, and a second member having a second movable stop means thereon and cooperating with said fixed stop to limit the magnitude of rotation of said stem in the other direction, and interconnecting means carried by said first and second members and adjustably securing said members together such that the distance separating said movable stop means can be varied to vary the possible magnitude of rotation of said stem.

9. The faucet valve of claim 8, wherein one of said members is telescopically received at least partially within the other of said members and said interconnecting means comprise mating splines formed on said members.

10. The faucet valve of claim 8, wherein one of said members is telescopically received at least partially within the other of said members, one of movable stop means being formed on the one of said members and projecting through an opening formed in the other of said members.

11. A single handle hot and cold water mixing and flow control faucet valve of the type having a main body enclosing relatively movable valve means selectively operable to connect or isolate hot and cold water sources with water outlet means and an elongate manually movable operating stem operably connected to said valve means for movement therewith and projecting from said main body, said stem being swingable in a plane between an off position and a full volume position to vary the volume of water passing through said faucet valve and rotatable about its own axis between a cold water only position and a hot water only position to vary the proportions of hot and cold water passing through said faucet valve, the improvement comprising: a fixed stop secured to and projecting from said main body adjacent said stem, and first movable stop means secured to said stem for movement therewith and cooperating with said fixed stop to prevent swinging movement of said stem to and from said off position unless said stem is in the cold water only rotational position and to prevent rotation of said stem in one rotational direction.

12. The faucet valve of claim 11, wherein said first movable stop means are formed on a first member secured to said stem and comprise a circular flange having a center concentric with the center of said stem, said flange having an opening therein registering with said fixed stop when said stem is in the cold water only rotational position, and a straight line flange extending inwardly from the circular flange adjacent said opening.

13. The faucet valve of claim 11, further comprising second movable stop means secured to said stem for movement therewith and cooperating with said fixed stop to limit the extent of possible rotational movement of said stem away from said cold water only position in the other rotational direction towards said hot water only position.

14. The faucet valve of claim 12, further comprising second movable stop means secured to said stem for movement therewith and cooperating with said fixed stop to limit the extent of possible rotational movement of said stem away from said cold water only position, said second movable stop means being formed on a second member secured to stem and comprising a projection extending within the confines of said circular flange and spaced a predetermined arc distance measured on a circle having a center concentric with the center of said stem from said straight line flange.

15. The faucet valve of claim 14, wherein said first and second members are adjustably secured together such that said predetermined arc distance can be varied by adjustment of the relative positions of said first and second members.

* * * * *